(No Model.)
G. W. HOWELL.
WHEEL.
No. 293,251. Patented Feb. 12, 1884.
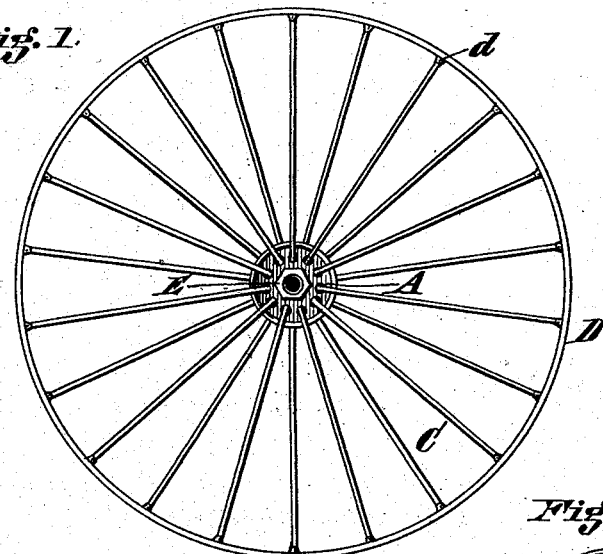
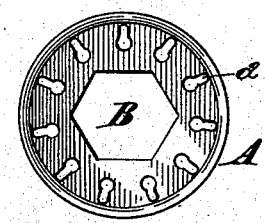
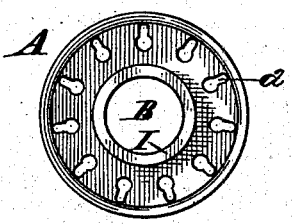
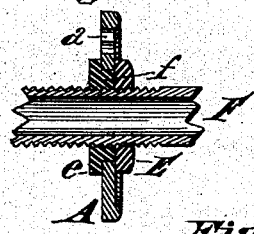
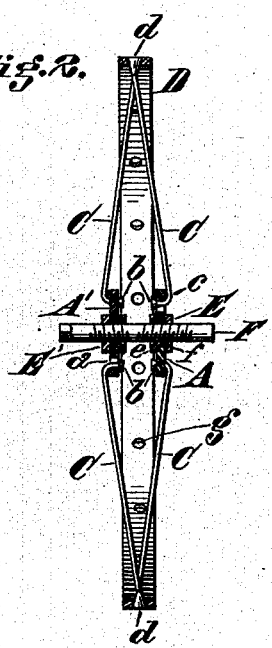
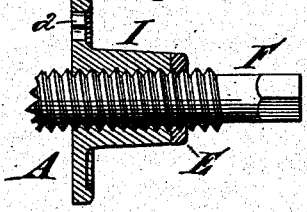

UNITED STATES PATENT OFFICE.

GEORGE W. HOWELL, OF COVINGTON, KENTUCKY.

WHEEL.

SPECIFICATION forming part of Letters Patent No. 293,251, dated February 12, 1884.

Application filed June 26, 1883. (No model.)

*To all whom it may concern:*

Be it known that I, GEORGE W. HOWELL, a citizen of the United States, and a resident of Covington, in the county of Kenton and State of Kentucky, have invented certain new and useful Improvements in Wheels, of which the following is a specification.

My invention relates to a wheel adapted to be used for buggies, sulkies, velocipedes, and pulleys for shafting.

The object of my invention is to provide a cheap, strong, and durable wheel or pulley, and one which can be used with a metallic tire, and which can be tightened without taking it off of the rim or fellies by means of contraction and expansion of the hub, all of which will be fully set forth in the description of the accompanying drawings.

Figure 1 is a side elevation of my improvement. Fig. 2 is a central vertical section; Fig. 3, a plan view of one of the central disk-hubs. Fig. 4 is an enlarged view of the axle and the hub; Fig. 5, a plan view of the disk-hub shown in section in Fig. 6; Fig. 6, a modified form of disk and hub combined; and Fig. 7 is a modified T-shaped rim.

A A' represent disks, which are pierced with holes B for the hub and axle or shaft.

$a$ is a circular series of slotted holes pierced in the flanges of A A', as shown in Figs. 3 and 5.

C represents spokes, which are formed of rods, the inner ends of which are bent to form necks $c$, as shown in Fig. 2.

$b$ represents a head on the inner end of the spoke. The slots $a$ are, at the inner points, sufficiently large to allow the head to be inserted when the neck is drawn into the outer portion of slots $a$, and thus secured.

D represents a rim, preferably made of metal and pierced with countersunk holes, through which the spokes pass, which are provided with an enlarged head, $d$, fitting into the countersunk holes, to hold the spokes, rims, and disks together.

$e f$ represent flanged thimble-hubs with female threads cut in the bore, and the exterior periphery of which fits the periphery of hole B and is preferably many-sided. The flanged portion $e$ rests and bears against the inner faces of the disks A and A'.

E E' represent jam-nuts which engage with the threaded sleeve F. The thimbles $f$ are in like manner threaded to screw on said sleeve. The disks A A', thimble-nuts $e f$, and jam-nuts E E' are duplicates of each other, except reversed in position, as shown in Fig. 2. When the axle is to be made fast to the wheel, instead of sleeve F, a solid threaded shaft may be employed. The sleeve F screws as on axial journal. The threads on the sleeve or axle F are right and left handed.

The wheel is put together in the following manner: The spokes are inserted through the rim. The head $b$ and neck $c$ being small enough to pass through the holes $g$, cut in rim D, and the disks screwed onto the shaft F so as to come together in the center, the head $b$ of spokes C may be hooked into the slotted holes $a$ in the disks A A'. Then shaft or sleeve F is turned to draw the disks apart, as shown in Fig. 2, until the spokes C, rim D, and disks A A' are drawn taut. The jam-nuts E E' are then screwed on the shaft F and the disks A A' set in a fixed position. The disks A A' may be each provided with a hub, I, rigidly connected to disks A A', as shown in Fig. 6, if desired, and the axle or sleeve screw-threaded to fit female threads cut in hub I. The shaft-hole B is shown as many-sided, and the thimble-hub $f$ is made of like shape in Fig. 3, which is the preferred form, so as to prevent strain on the spoke C when the shaft or sleeve is turned to draw the disks apart.

H, Fig. 7, represents a T-shaped rim, which is stronger than the rim shown in Fig. 2. A wooden felly may be used inside the rim D, if desired. The rim D may be also grooved to receive a rubber tire when constructed for velocipedes.

Instead of having a head, $d$, secured tightly to the spokes, these heads may be tapped on the wires C, and then screwed on after the spokes are inserted in the rim D, and then headed down or set in any desired way to prevent the unscrewing of the heads $d$; or the rim D may be tapped and the spoke C threaded to screw into the rim, and then headed down, if desired.

When the wheel herein described is used for shafting, I use a set-screw instead of jam-nuts for holding the shaft fast to the hub.

By making the hub of the flanged collars $e f$ with a polygonal exterior, and of disks A A', pierced to fit upon said collars, which collars are threaded to engage with the right and left threads of a sleeve or shaft, the spokes are readily tightened, with equal strain upon each side of the center, by simply turning the threaded sleeve or shaft. This mode of constructing the hub is also cheaper and more durable than other forms hitherto employed, and allows flanged collars $e$ $f$ of different-sized sleeve or spindle bore to be employed.

I claim—

1. The combination, in a wheel-hub, of the disks A A', the flanged thimbles $e$ and $f$, connected with the disks and having internal screw-threads, and the shaft or sleeve F, having right and left exterior threads, and engaging the threads of the thimbles to simultaneously adjust both the disks, substantially as and for the purpose described.

2. The combination, in a wheel-hub, of the disks A A', each having a many-sided orifice, the interiorly-threaded flanged thimbles $e$ and $f$, having exterior surfaces fitting in the orifices of the disks, and the shaft or sleeve F, having right and left screw-threads engaging the threads of the thimbles to simultaneously adjust both disks, substantially as described.

3. The combination, in a wheel-hub, of the disks A A', the interiorly-threaded thimbles connected with the disks, and the shaft or sleeve F, having right and left threads engaging the threads of the thimbles to simultaneously adjust both the disks, substantially as described.

4. In combination with the disks A A', having the slotted spoke-holes $a$ and screw-threaded hub, the spokes C, having neck $c$, and connected to the rim D and disks A A', substantially as herein set forth.

5. The combination, with the disks A A', the threaded thimbles, and the threaded shaft or sleeve, of the T-shaped rim H and the spokes C, having their outer ends secured in the lateral flanges of the rim, substantially as shown and described.

In testimony whereof I have hereunto set my hand.

GEORGE W. HOWELL.

Witnesses:
JNO. E. JONES,
A. GLUCHOWSKY.